US009557179B2

(12) United States Patent
 Finlow-Bates

(10) Patent No.: US 9,557,179 B2
(45) Date of Patent: Jan. 31, 2017

(54) NAVIGATION USING DYNAMIC SPEED LIMITS

(71) Applicant: QUALCOMM Incorporated, San Diego, CA (US)

(72) Inventor: Keir Finlow-Bates, Kangasala (FI)

(73) Assignee: QUALCOMM Incorporated, San Diego, CA (US)

( * ) Notice: Subject to any disclaimer, the term of this patent is extended or adjusted under 35 U.S.C. 154(b) by 59 days.

(21) Appl. No.: 13/971,589

(22) Filed: Aug. 20, 2013

(65) Prior Publication Data

US 2015/0057831 A1    Feb. 26, 2015

(51) Int. Cl.
 *G01C 21/00*     (2006.01)
 *G01C 21/26*     (2006.01)
 (Continued)

(52) U.S. Cl.
 CPC ........... *G01C 21/26* (2013.01); *G01C 21/3697* (2013.01); *G08G 1/09626* (2013.01);
 (Continued)

(58) Field of Classification Search
 CPC ............... B60R 1/12; B60R 2011/0026; B60R 2011/0033; B60R 1/00; B60R 11/0235; B60R 2011/0282; B60R 2011/0288; B60R 2011/0294; B60R 2001/1215; B60R 2001/1253; B60R 11/02; B60R 2001/1284; B60R 2001/12; B60R 11/04; B60R 9/00798; B60R 9/00818; G08G 1/161; G08G 1/163; G08G 1/16; G08G 1/166; G08G 1/09626; G08G 1/096716; G08G 1/167; G08G 1/04; G08G 1/052; G08G 1/096775; G08G 1/096758; G08G 1/0967; G08G 1/07; G08G 1/08; G08G 1/0112;G08G 1/0116; G08G 1/0129; G08G 1/0141; G08G 1/091; G08G 1/096708; B60W 2550/402; B60W 30/16; B60W 2050/0078; B60W 30/18154; B60W 40/06; B60W 10/06; B60W 10/18; B60W 2550/141; B60W 40/04; B60W 2550/22; B60W 30/143; B60W 2520/10; B60W 2720/10; B60W 30/14; B60W 30/146; B60Q 1/2665; B60Q 3/023; B60Q 1/22; B60Q 1/2661; B60Q 1/503; B60Q 1/54; B60Q 1/323; B60Q 3/004; B60Q 5/006; B60Q 9/00; G01C 21/32; G01C 21/3469; G01C 21/34; G01C 21/36; G01C 21/3697; B60K 35/00; B60K 2350/1072; B60K 2350/1096; B60K 2350/352; G02B 27/01
 See application file for complete search history.

(56) References Cited

U.S. PATENT DOCUMENTS 5,689,252 A * 11/1997 Ayanoglu ............. G08G 1/0969
                                                340/905
6,161,072 A * 12/2000 Clapper ............. B60K 31/0058
                                                180/170
(Continued)

FOREIGN PATENT DOCUMENTS

EP    2409289 A1    1/2012
WO    2007024365 A2    3/2007
WO    2012089282 A1    7/2012

OTHER PUBLICATIONS

Boriboonsomsin K., et al., "Selection of Control Speeds in Dynamic Intelligent Speed Adaptation System: A Preliminary Analysis," 2008, pp. 1-11.

(Continued)

*Primary Examiner* — Jonathan L Sample
(74) *Attorney, Agent, or Firm* — Silicon Valley Patent Group LLP

(57) ABSTRACT

Method, computer program product, and apparatus for providing navigation guidance to vehicles are disclosed. In some implementations, a navigation device can be configured to determine a dynamic speed limit for a vehicle based on the location of the vehicle in a road segment, and displays the dynamic speed limit in a display of the navigation device.

26 Claims, 9 Drawing Sheets

(51) Int. Cl.
*G01C 21/36* (2006.01)
*G08G 1/0962* (2006.01)
*G08G 1/0967* (2006.01)

(52) U.S. Cl.
CPC .. *G08G 1/096716* (2013.01); *G08G 1/096758* (2013.01); *G08G 1/096775* (2013.01)

(56) References Cited

U.S. PATENT DOCUMENTS

| | | | | |
|---|---|---|---|---|
| 6,462,675 B1* | 10/2002 | Humphrey | ............ | G08G 1/052 340/441 |
| 6,693,555 B1* | 2/2004 | Colmenarez | ..... | G08G 1/096716 340/441 |
| 6,778,074 B1* | 8/2004 | Cuozzo | ................... | G01D 7/00 340/441 |
| 6,807,464 B2 | 10/2004 | Yu et al. | | |
| 7,042,345 B2* | 5/2006 | Ellis | ....................... | A61H 3/061 340/436 |
| 7,440,842 B1* | 10/2008 | Vorona | ......................... | 701/117 |
| 7,616,781 B2* | 11/2009 | Schofield | .......... | G06K 9/00818 382/104 |
| 7,711,468 B1* | 5/2010 | Levy | ................... | B60W 30/143 340/441 |
| 8,350,723 B2 | 1/2013 | Serex | | |
| 8,725,394 B2* | 5/2014 | Bahlmann | .......... | B60W 30/146 340/907 |
| 9,251,703 B1* | 2/2016 | Mbekeani | ............. | G08G 1/091 |
| 2002/0027511 A1* | 3/2002 | Horita | ................. | G08G 1/0962 340/988 |
| 2002/0159270 A1* | 10/2002 | Lynam | .................... | B60K 35/00 362/492 |
| 2002/0186228 A1* | 12/2002 | Kobayashi | ............ | B60K 35/00 345/633 |
| 2004/0075582 A1* | 4/2004 | Bergan | .................... | G08G 1/01 340/936 |
| 2004/0236596 A1 | 11/2004 | Chowdhary et al. | | |
| 2005/0232469 A1* | 10/2005 | Schofield | .......... | G06K 9/00818 382/104 |
| 2005/0267658 A1* | 12/2005 | Yuan | ................... | B60W 30/146 701/36 |
| 2006/0028330 A1* | 2/2006 | Gallant | ................. | B60K 35/00 340/441 |
| 2006/0052909 A1* | 3/2006 | Cherouny | ............ | B60K 28/063 701/1 |
| 2007/0027583 A1* | 2/2007 | Tamir | ................. | G06Q 30/0283 701/1 |
| 2007/0050110 A1* | 3/2007 | Kondoh | ................. | B60K 31/18 701/36 |
| 2008/0221787 A1* | 9/2008 | Vavrus | ............... | G01C 21/3469 701/423 |
| 2008/0249706 A1* | 10/2008 | Bradai | .................. | B60Q 1/085 701/532 |
| 2009/0079555 A1* | 3/2009 | Aguirre De Carcer | ................... | G07C 5/008 340/441 |
| 2009/0115638 A1* | 5/2009 | Shankwitz | ............ | G01C 21/26 340/988 |
| 2009/0201140 A1* | 8/2009 | Fargas | ................ | B60W 40/101 340/441 |
| 2009/0240398 A1* | 9/2009 | Nanami | ................ | B60W 40/04 701/41 |
| 2009/0243883 A1* | 10/2009 | Simon | ............. | G08G 1/096716 340/905 |
| 2010/0045451 A1* | 2/2010 | Periwal | .................... | B60Q 9/00 340/439 |
| 2010/0045452 A1* | 2/2010 | Periwal | .................... | B60Q 9/00 340/439 |
| 2010/0312446 A1* | 12/2010 | Schofield | .......... | G06K 9/00818 701/70 |
| 2011/0077028 A1* | 3/2011 | Wilkes, III | ............ | B60W 50/14 455/456.3 |
| 2011/0161004 A1* | 6/2011 | Chao | .................. | G01C 21/3697 701/408 |
| 2011/0161116 A1* | 6/2011 | Peak et al. | ........................ | 705/4 |
| 2011/0190972 A1* | 8/2011 | Timmons | ............... | G01C 21/34 701/31.4 |
| 2011/0213628 A1* | 9/2011 | Peak et al. | ........................ | 705/4 |
| 2011/0307155 A1* | 12/2011 | Simard | ................. | F02D 11/105 701/93 |
| 2011/0307165 A1* | 12/2011 | Hiestermann | .......... | G01C 21/32 701/119 |
| 2012/0059574 A1* | 3/2012 | Hada | .................... | G08G 1/0112 701/119 |
| 2012/0123806 A1* | 5/2012 | Schumann et al. | ............... | 705/4 |
| 2012/0130625 A1 | 5/2012 | Srivastava | | |
| 2012/0140080 A1* | 6/2012 | Taylor | ................. | B60C 23/0408 348/148 |
| 2012/0161982 A1* | 6/2012 | Musachio | ................ | G08G 1/07 340/932 |
| 2012/0245756 A1* | 9/2012 | Cooprider et al. | ............... | 701/1 |
| 2012/0254707 A1* | 10/2012 | Cooke | .................. | G01C 21/32 714/799 |
| 2013/0024060 A1* | 1/2013 | Sukkarie | ................. | H04L 67/12 701/22 |
| 2013/0099914 A1* | 4/2013 | Yoon | ........................ | G01D 7/06 340/441 |
| 2013/0245945 A1* | 9/2013 | Morita | ............. | G08G 1/096716 701/533 |
| 2013/0297095 A1* | 11/2013 | Kwak | ................ | G06Q 10/0639 701/1 |
| 2014/0188376 A1* | 7/2014 | Gordon | ............ | G08G 1/096775 701/118 |
| 2014/0277835 A1* | 9/2014 | Filev | .................. | G01C 21/3469 701/2 |
| 2014/0304635 A1* | 10/2014 | Kristinsson | ........... | G06F 3/0484 715/771 |
| 2015/0057831 A1* | 2/2015 | Finlow-Bates | .... | G08G 1/09626 701/1 |
| 2016/0042239 A1* | 2/2016 | Fowe | ........................ | G06T 7/20 382/104 |
| 2016/0185219 A1* | 6/2016 | Sakata | .................... | G08G 1/16 701/36 |

OTHER PUBLICATIONS

International Search Report and Written Opinion—PCT/US2014/046975—ISA/EPO—Nov. 20, 2014.

\* cited by examiner

| Road Segment | Default Speed Limit (KM/H) | Day Time Speed Limit (KM/H) | Evening/ Night Speed Limit (KM/H) |
|---|---|---|---|
| A1 | 100 | 100 | 80 |
| A2 | 50 | 50 | 40 |
| A3 | 90 | 90 | 80 |
| B1 | 70 | 70 | 60 |
| B2 | 50 | 50 | 40 |
| B3 | 120 | 120 | 100 |
| C1 | 120 | 120 | 90 |
| C2 | 80 | 80 | 60 |
| C3 | 40 | 40 | 40 |
| D1 | 100 | 100 | 100 |
| D2 | 80 | 80 | 60 |

| Road Segment | Default Speed Limit (in KM) | Rush Hour Speed Limit (in KM) | Non-Rush Hour Speed Limit (in KM) |
|---|---|---|---|
| A1 | 90 | 90 | 100 |
| A2 | 45 | 45 | 50 |
| A3 | 80 | 80 | 90 |
| B1 | 60 | 60 | 70 |
| B2 | 45 | 45 | 50 |
| B3 | 110 | 110 | 120 |
| C1 | 100 | 100 | 120 |
| C2 | 70 | 70 | 80 |
| C3 | 40 | 40 | 40 |
| D1 | 100 | 100 | 100 |
| D2 | 70 | 70 | 80 |

FIG. 3

| Road Segment | Spring Speed Limit (in KM) | Summer Speed Limit (in KM) | Autumn Speed Limit (in KM) | Winter Speed Limit (in KM) |
|---|---|---|---|---|
| A1 | 100 | 100 | 100 | 80 |
| A2 | 45 | 50 | 50 | 40 |
| A3 | 90 | 90 | 90 | 80 |
| B1 | 70 | 70 | 70 | 60 |
| B2 | 45 | 50 | 50 | 40 |
| B3 | 120 | 120 | 120 | 100 |
| C1 | 110 | 120 | 120 | 90 |
| C2 | 70 | 80 | 80 | 60 |
| C3 | 40 | 40 | 40 | 40 |
| D1 | 100 | 100 | 100 | 100 |
| D2 | 70 | 80 | 80 | 60 |

FIG. 4

| Road Segment | Lane 1 Speed Limit (in KM) | Lane 2 Speed Limit (in KM) | Lane 3 Speed Limit (in KM) | Lane 4 Speed Limit (in KM) | • • • |
|---|---|---|---|---|---|
| A1 | 100 | 90 | 90 | 90 | • • • |
| A2 | 50 | 50 | 50 | NA | • • • |
| A3 | 90 | 90 | NA | NA | • • • |
| B1 | 70 | 70 | NA | NA | • • • |
| B2 | 60 | 60 | 60 | NA | • • • |
| B3 | 120 | 120 | 100 | 100 | • • • |
| C1 | 120 | 110 | 110 | 110 | • • • |
| C2 | 80 | 80 | 80 | 80 | • • • |
| C3 | 40 | 40 | 40 | NA | • • • |
| D1 | 100 | 100 | 90 | 90 | • • • |
| D2 | 80 | 80 | 80 | NA | • • • |

FIG. 5B

| Road Segment | Vehicle Wt. less than 5 tons | Vehicle Wt. between 5 to 10 tons | Vehicle Wt. over 10 tons | • • • |
|---|---|---|---|---|
| A1 | 100 | 100 | 80 | • • • |
| A2 | 50 | 45 | 40 | • • • |
| A3 | 90 | 90 | 80 | • • • |
| B1 | 70 | 70 | 60 | • • • |
| B2 | 50 | 45 | 40 | • • • |
| B3 | 120 | 120 | 100 | • • • |
| C1 | 120 | 110 | 90 | • • • |
| C2 | 80 | 70 | 60 | • • • |
| C3 | 40 | 40 | 40 | • • • |
| D1 | 100 | 100 | 100 | • • • |
| D2 | 80 | 70 | 60 | • • • |

FIG. 6B

NAVIGATION USING DYNAMIC SPEED LIMITS

FIELD

The present disclosure relates to the field of wireless communications. In particular, the present disclosure relates to providing navigation guidance to vehicles.

BACKGROUND

Conventional personal navigation devices (PDNs), such as TomTom Go, Mio Moov, and Google Navigate, typically show the summer speed limits all year around. With these conventional PNDs, a driver would have to mentally compute the speed limits of certain roads in some situations in order to drive within the speed limits of such roads. For example, a user may have to subtract 20 Kilometers per hour (KM/H) from the speed limits displayed by the PNDs in winter in order to drive within the speed limits, especially in situations when the user has missed the speed limit signs. For some other roads for example, electric speed limit sign may be provided, where the speed limit sign may indicate 80 KMPH between 8 AM and 5 PM, but may indicate 100 KM/H the rest of the time. The conventional PNDs have failed to cope with the situations of variable speed limits described above.

Therefore, there is a need for method, device, computer program product, and apparatus that can address the above issues of the conventional methods and devices.

SUMMARY

The present disclosure relates to providing navigation guidance to vehicles. According to embodiments of the present disclosure, a method may include determining a location of a vehicle in a road segment by a navigation device, where the location of the vehicle in the road segment includes a lane the vehicle is in, determining a dynamic speed limit in accordance with the location of the vehicle in the road segment, and displaying the dynamic speed limit in a display of the navigation device.

In yet another embodiment, a navigation device comprises a control unit including processing logic, and the processing logic comprises logic configured to determine a location of a vehicle in a road segment by a navigation device, where the location of the vehicle in the road segment includes a lane the vehicle is in, logic configured to determine a dynamic speed limit in accordance with the location of the vehicle in the road segment, and logic configured to display the dynamic speed limit in a display of the navigation device.

In yet another embodiment, a non-transitory medium storing instructions for execution by one or more computer systems, the instructions comprise instructions for determining a location of a vehicle in a road segment by a navigation device, where the location of the vehicle in the road segment includes a lane the vehicle is in, instructions for determining a dynamic speed limit in accordance with the location of the vehicle in the road segment, and instructions for displaying the dynamic speed limit in a display of the navigation device.

In yet another embodiment, an apparatus comprises means for determining a location of a vehicle in a road segment by a navigation device, where the location of the vehicle in the road segment includes a lane the vehicle is in, means for determining a dynamic speed limit in accordance with the location of the vehicle in the road segment, and means for displaying the dynamic speed limit in a display of the navigation device.

BRIEF DESCRIPTION OF THE DRAWINGS

The aforementioned features and advantages of the disclosure, as well as additional features and advantages thereof, will be more clearly understandable after reading detailed descriptions of embodiments of the disclosure in conjunction with the following drawings.

FIG. 3 illustrates another example of dynamic speed limits for the various road segments of FIG. 1 based at least in part on rush hour and non-rush hour according to some aspects of the present disclosure.

FIG. 4 illustrates yet another example of dynamic speed limits for the various road segments of FIG. 1 based at least in part on different seasons in a year according to some aspects of the present disclosure.

FIG. 5A and FIG. 5B illustrate yet another example of dynamic speed limits for the various road segments of FIG. 1 based at least in part on different lanes in a road segment according to some aspects of the present disclosure.

FIG. 6A and FIG. 6B illustrate yet another example of dynamic speed limits for the various road segments of FIG. 1 based at least in part on different vehicle classes according to some aspects of the present disclosure.

Like numbers are used throughout the figures.

DESCRIPTION OF EMBODIMENTS

Embodiments of method, device, computer program product, and apparatus for providing navigation guidance to vehicles are disclosed. The following descriptions are presented to enable any person skilled in the art to make and use the disclosure. Descriptions of specific embodiments and applications are provided only as examples. Various modifications and combinations of the examples described herein will be readily apparent to those skilled in the art, and the general principles defined herein may be applied to other examples and applications without departing from the spirit and scope of the disclosure. Thus, the present disclosure is not intended to be limited to the examples described and shown, but is to be accorded the widest scope consistent with the principles and features disclosed herein. The word "exemplary" or "example" is used herein to mean "serving as an example, instance, or illustration." Any aspect or embodiment described herein as "exemplary" or as an "example" in not necessarily to be construed as preferred or advantageous over other aspects or embodiments.

Figures 1, 2:
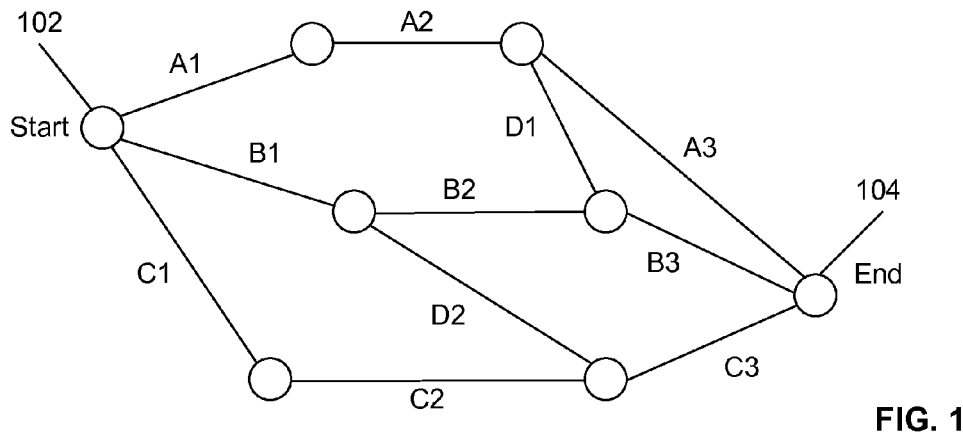
FIG. 1 illustrates examples of various road segments of an area according to some aspects of the present disclosure.
FIG. 2 illustrates an example of dynamic speed limits for the various road segments of FIG. 1 based at least in part on time of the day according to some aspects of the present disclosure.

FIG. 1 illustrates examples of various road segments of an area according to some aspects of the present disclosure. In the example shown in FIG. 1, a section of a map may be split into road segments, connecting a Start location 102 and an End location 104. A line connecting two circles indicates a road segment, such as road segments A1 through A3, B1 through B3, C1 through C3, D1 and D2. A circle indicates an intersection between two or more road segments. According to aspects of the present disclosure, the speed limit of a road segment may be changing based on various conditions. Such change of speed limit for a road segment is also referred to as dynamic speed limit of a road segment. The conditions for such dynamic speed limit may include, but not limited to: 1) current time and date; 2) current weather condition; 3) current road condition; and 4) a vehicle class, where the vehicle class may include a weight of the vehicle. In addition, the dynamic speed limit may further include, but not limited to: 1) the dynamic speed limit for the lane the vehicle is in at the current time and date; 2) the dynamic speed limit for a vehicle class at the current time and date; 3) the dynamic speed limit for the road segment for day time traffic; 4) the dynamic speed limit for the road segment for night time traffic; 5) the dynamic speed limit for the road segment for rush hour traffic; 6) the dynamic speed limit for the road segment for non-rush hour traffic; and 7) the dynamic speed limit for the road segment in one of Spring, Summer, Autumn, and Winter.

FIG. 2 illustrates an example of dynamic speed limits for the various road segments of FIG. 1 based at least in part on time of the day according to some aspects of the present disclosure. In the example shown in FIG. 2, road segment A1 may have a default speed limit of 100 kilometer per hour (KM/H), a day time speed limit of 100 KM/H, and an evening or night speed limit of 80 KM/H. Similarly, road segment B2 may have a default speed limit of 50 KM/H, a day time speed limit of 50 KM/H, and an evening or night speed limit of 50 KM/H. Road segment C3 may have a default speed limit of 40 KM/H, a day time speed limit of 40 KM/H, and an evening or night speed limit of 40 KM/H. Road segment D2 may have a default speed limit of 80 KM/H, a day time speed limit of 80 KM/H, and an evening or night speed limit of 60 KM/H. Note that some road segments may have different speed limits for different times of a day, for example different speed limits for day time and evening; while other road segments may have the same speed limit for both the day time and evening. To accurately inform users the correct speed limit for the road segments they may travel, the methods of the current disclosure take such changes in speed limit for different road segments into account in determining the dynamic speed limit of a road segment to the users.

FIG. 3 illustrates another example of dynamic speed limits for the various road segments of FIG. 1 based at least in part on rush hour and non-rush hour according to some aspects of the present disclosure. As shown in FIG. 3, road segment A2 may have a default speed limit of 45 KM/H, a rush hour speed limit of 45 KM/H, and a non-rush hour speed limit of 50 KM/H. Similarly, road segment B1 may have a default speed limit of 60 KM/H, a rush hour speed limit of 60 KM/H, and a non-rush hour speed limit of 70 KM/H. Road segment C1 may have a default speed limit of 100 KM/H, a rush hour speed limit of 100 KM/H, and a non-rush hour speed limit of 120 KM/H. Road segment D1 may have a default speed limit of 100 KM/H, a rush hour speed limit of 100 KM/H, and a non-rush hour speed limit of 100 KM/H. According to aspects of the present disclosure, some road segments may have different speed limits for rush hour and for non-rush hour traffic; while other road segments may have the same speed limit for both the rush hour and non-rush hour traffic. To accurately inform users the correct speed limit for the road segments they may travel, the methods of the current disclosure take such conditions for the road segments into account and provide navigation guidance to the users that include such dynamic speed limits.

FIG. 4 illustrates yet another example of dynamic speed limits for the various road segments of FIG. 1 based at least in part on different seasons in a year according to some aspects of the present disclosure. As shown in the example of FIG. 4, road segment A3 may have a speed limit of 90 KM/H for Spring, which is kept the same for Summer and Autumn, and the speed limits drops to 80 KM/H for Winter. Road segment B2 may have a speed limit of 45 KM/H for Spring, which is increased to 50 KM/H for Summer and Autumn, and drops to 40 KM/H for Winter. Road segment C3 may have the same speed limit of 40 KM/H for all four seasons. Road segment D2 may have a speed limit of 70 KM/H for Spring, which increases to 80 KM/H in Summer and Autumn, and decreases to 60 KM/H in Winter. According to aspects of the present disclosure, some road segments may have different speed limits for different seasons of the year; while other road segments may have the same speed limit for all four seasons. To accurately inform users the correct speed limit for the road segments, the methods of the current disclosure take such seasonal changes in speed limit for different road segments into account in determining the dynamic speed limit of a road segment to the users.

Figure 5A:
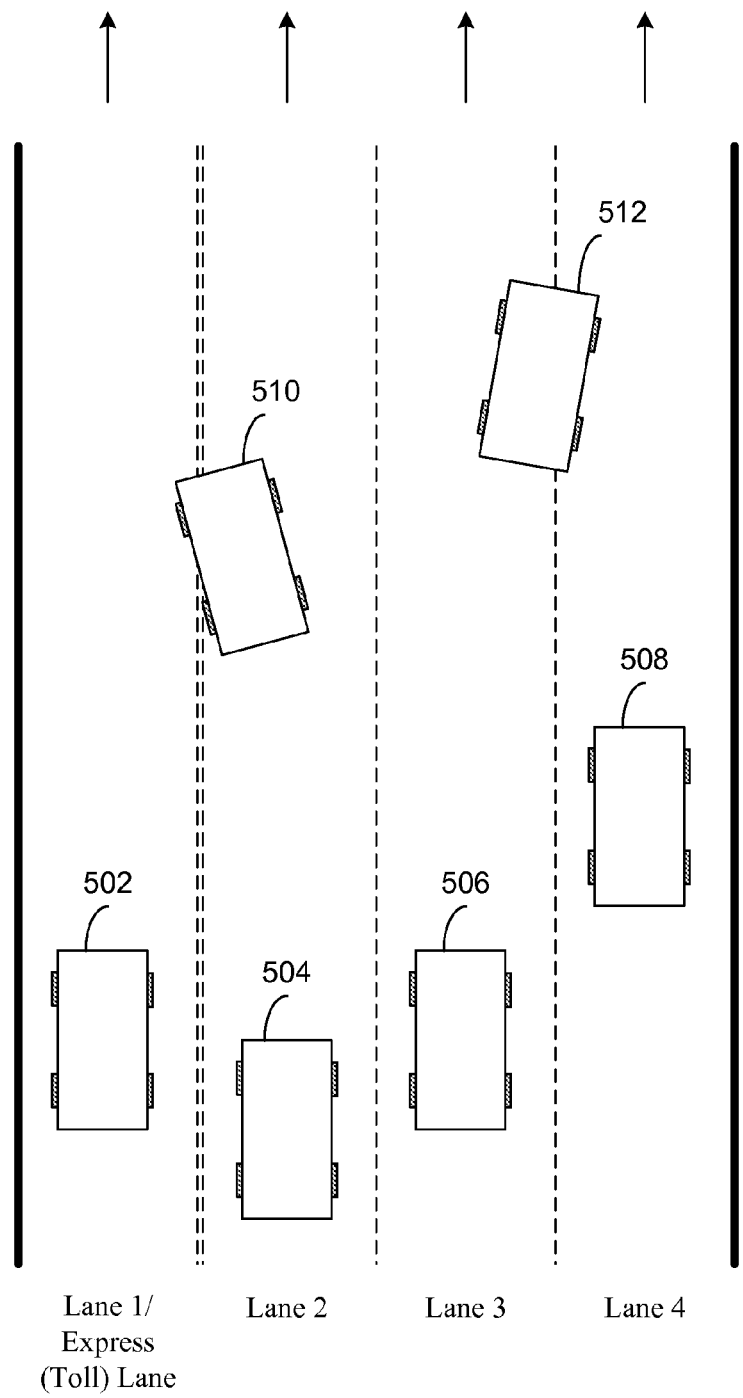

FIG. 5A and FIG. 5B illustrate yet another example of dynamic speed limits for the various road segments of FIG. 1 based at least in part on different lanes in a road segment according to some aspects of the present disclosure. As shown in FIG. 5A, a plurality of vehicles may travel in various lanes of a road segment. For example, vehicle 502 may be in Lane 1, vehicle 504 may be in Lane 2, vehicle 506 may be in Lane 3, and vehicle 508 may be in Lane 4. In addition, vehicle 510 may be in the process of changing lanes from Lane 2 to Lane 1, and vehicle 512 may be in the process of changing lanes from Lane 3 to Lane 4. According to aspects of the present disclosure, in some road segments, one or more lanes (such as Lane 1 in FIG. 5A) may be express lanes or toll lanes, where vehicles in these lanes may travel at a different speed limit than the speed limit in other lanes in the road segment. Methods of the current disclosure take such different speed limits for different lanes into account and provide such information to the users in order to accurately inform users the correct speed limit for each lane of the road segments they may be in. According to aspects of the present disclosure, as a vehicle changes lanes, the dynamic speed limit may be updated as a result of the vehicle has moved from one lane to another lane in the road segment.

In FIG. 5B, examples of different speed limits for the various road segments of FIG. 1 are shown. For example, for road segment A1, the speed limit for Lane 1 may be 100 KM/H, for Lanes 2-4 may be 90 KM/H. For road segment B1, the speed limit for Lanes 1-2 may be 70 KM/H, and assuming road segment B1 has only two lanes, thus the speed limit for Lanes 3-4 is labeled as not applicable (NA). For road segment C1, the speed limit for Lane 1 may be 120 KM/H, and the speed limit for Lanes 2-4 may be 110 KM/H. For road segment D2, the speed limit for Lanes 1-3 may be 80 KM/H, and assuming road segment D2 has only three lanes, the speed limit for Lane 4 is labeled as not applicable. According to aspects of the present disclosure, disclosed methods take such different speed limits for different lanes into account and provide such information to the users in order to accurately inform users the correct speed limit for each lane of the road segments they may be in.

Figure 6A:
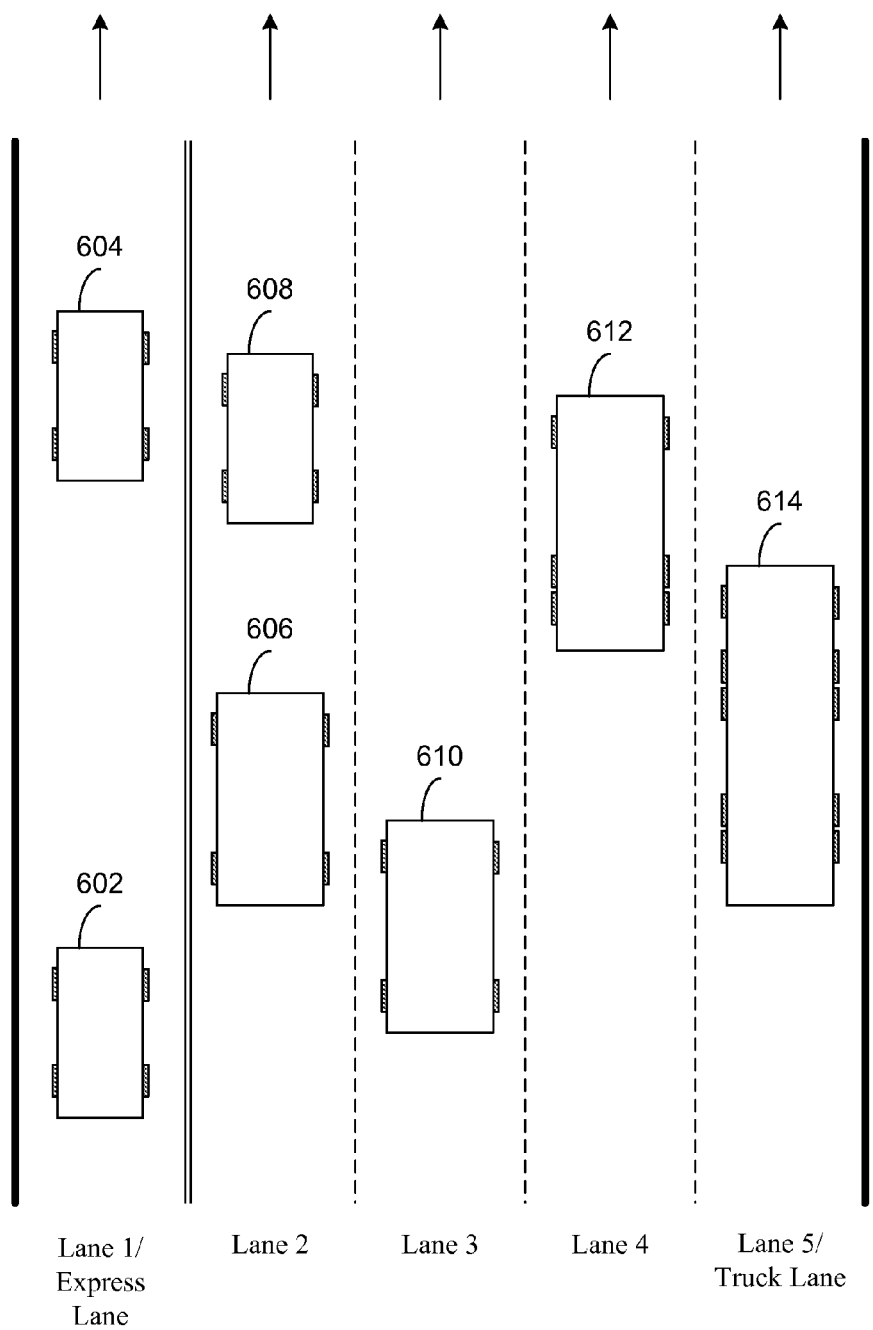

FIG. 6A and FIG. 6B illustrate yet another example of dynamic speed limits for the various road segments of FIG. 1 based at least in part on different vehicle classes according to some aspects of the present disclosure. In the example shown in FIG. 6A, a plurality of vehicles may travel in various lanes of a road segment. For example, vehicles 602, 604, and 608 may belong to one vehicle class, such as the class of cars; vehicles 606 and 610 may belong to another vehicle class, such as the class of commercial passenger minivans; vehicle 612 may belong to yet another vehicle class, such as the class of light trucks; and vehicle 614 may belong to yet another vehicle class, such as the class of heavy trucks. According to aspects of the present disclosure, in some road segments, different classes of vehicles may be required to travel in different lanes (such as heavy trucks may be required to travel in Lane 5 in the example of FIG. 6A) and to travel at different speed limits. Methods of the current disclosure take such vehicle classes and their corresponding different speed limits into account and provide such information to the users in order to accurately inform users the correct speed limit for each vehicle class for the road segments they may be in.

In FIG. 6B, examples of different speed limits for different classes of vehicles for the various road segments of FIG. 1 are shown. For example, for road segment A2, the speed limit for vehicles having weight less than 5 tons may be 50 KM/H, the speed limit for vehicles having weight between 5 tons to 10 tons may be 45 KM/H, and the speed limit for vehicles having weight over 10 tons may be 40 KM/H. For road segment B3, the speed limit for vehicles having weight less than 5 tons and for vehicles having weight between 5 tons to 10 tons may be 120 KM/H, and the speed limit for vehicles having weight over 10 tons may be 100 KM/H. For road segment C2, the speed limit for vehicles having weight less than 5 tons may be 80 KM/H, the speed limit for vehicles having weight between 5 tons to 10 tons may be 70 KM/H, and the speed limit for vehicles having weight over 10 tons may be 60 KM/H. For road segment D1, the speed limit for vehicles of all classes may be 100 KM/H. According to aspects of the present disclosure, disclosed methods take such vehicle classes and their corresponding different speed limits into account and provide such information to the users in order to accurately inform users the correct speed limit for each vehicle class for the road segments they may be in.

Figure 7:
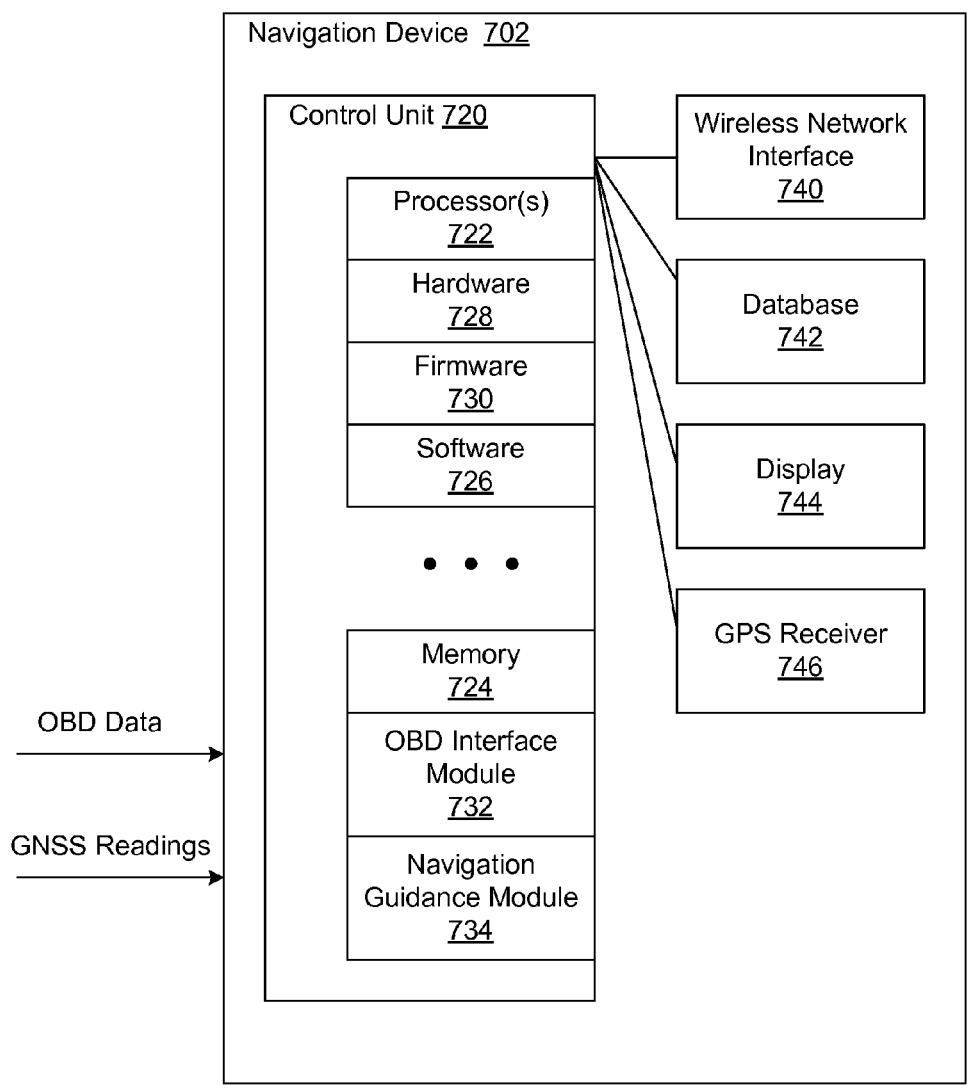
FIG. 7 illustrates a block diagram of an exemplary navigation device configured to provide navigation according to some aspects of the present disclosure.

According to aspects of the present disclosure, the functions described in FIG. 1 through FIG. 6B may be implemented by the navigation device of FIG. 7. In some implementations, the functions may be performed by processor(s), software, hardware, and firmware, or a combination of these blocks to perform various functions of the navigation device 702 described herein. FIG. 7 illustrates a block diagram of an exemplary navigation device configured to provide navigation guidance according to some aspects of the present disclosure. In the exemplary block diagram shown in FIG. 7, the navigation device 702 includes a control unit 720. The control unit 720 may include one or more processor(s) 722 and associated memory/storage 724. The control unit 720 may also include software 726, hardware 728, and firmware 730. The control unit 720 includes an on-board diagnostic (OBD) interface module 732 configured to interface and collect data from an OBD module of the vehicle. The control unit 720 further includes a navigation guidance module 734 configured to provide navigation guidance to the user. The navigation device 702 may further include a wireless network interface 740, a database 742, a display 744, and a GPS receiver 746 communicatively coupled to the control unit 720. Note that the GPS receiver 746 is optional as the navigation device 702 can be configured to receive GNSS readings from an external source. The wireless network interface 740 can be configured to enable the navigation device 702 to communicate with other servers, computers, navigation devices, and vehicles via one or more communication networks. In addition, the wireless network interface 740 can be configured to enable the navigation device 702 to communicate with one or more crowdsourcing databases.

In some implementations, an on board diagnostics (OBD) module of the vehicle may be configured to collect OBD data, including but not limited to: vehicle model/class, manufacture year, fuel system status, engine load value, engine revolutions per minute (RPM), speed, intake air temperature, run time since engine start, fuel level, barometric pressure, accelerator pedal position, cruise control, brake pressed, park/neutral position, motion sensor readings, odometer readings, and steering angle readings. In addition, the navigation device 702 may be configured to receive GNSS data from an external GPS receiver. The GNSS data received may include, but not limited to: latitude, longitude, altitude, and time of the vehicle.

According to aspects of the present disclosure, the OBD module may send the OBD data collected to the navigation device 702 via the OBD interface module 732. The control unit 720 may be configured to use the OBD data collected by the OBD interface module 732, GNSS readings collected by the GPS receiver 746 (or by an external GPS receiver), and map data stored in database 742 to determine the location of the vehicle in a road segment, such as which lane in a road segment the vehicle may be in. For example, the navigation device 702 may use the OBD data (angle of heading, odometer readings, speedometer readings, etc.), GNSS readings (latitude, longitude, time, etc.), and the map data to determine when a vehicle first enters a road segment. Similarly, the navigation device 702 may use the OBD data, GNSS readings, and the map data to determine when the vehicle performs a lane change.

In the example shown in FIG. 7, OBD interface module 732 and navigation guidance module 734 are illustrated separately from processor(s) 722 and/or hardware 728 for clarity, but may be combined and/or implemented in the processor(s) 722 and/or hardware 728 based on instructions in the software 726 and the firmware 730. Note that control unit 720 can be configured to implement methods of providing navigation guidance to vehicles. For example, the control unit 720 can be configured to implement functions of the navigation device 702 described in FIG. 1 through FIG. 6B.

Figure 8:
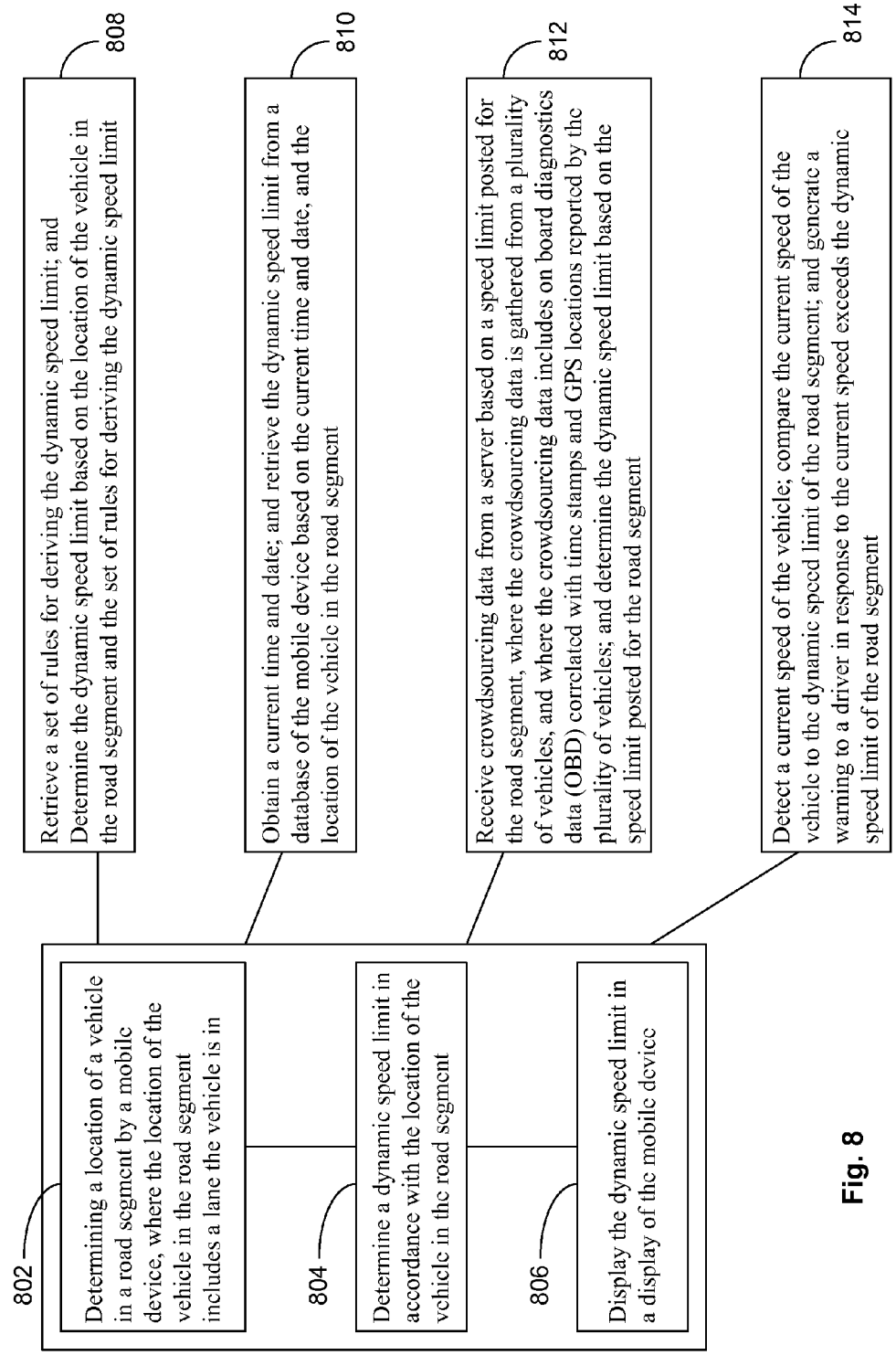
FIG. 8 illustrates a flow diagram of exemplary logical operations performed by the control unit of FIG. 7 to provide navigation guidance according to some aspects of the present disclosure.

FIG. 8 illustrates a flow diagram of exemplary logical operations performed by the control unit of FIG. 7 to provide navigation guidance according to some aspects of the present disclosure. In the exemplary controller shown in FIG. 8, in block 802, the navigation device determines a location of a vehicle in a road segment, where the location of the vehicle in the road segment includes a lane the vehicle is in. According to aspects of the present disclosure, the navigation device 702 may determine the location of the vehicle in a road segment using GNSS readings as well as using the OBD information received via the OBD module interface 732. In block 804, the navigation device determines a dynamic speed limit in accordance with the location of the vehicle in the road segment. In block 806, the navigation device displays the dynamic speed limit in a display.

According to some aspects of the present disclosure, the methods performed in block 804 may further include methods performed in blocks 808, 810 and 812. In block 808, the navigation device 702 retrieves a set of rules for deriving the dynamic speed limit, and determines the dynamic speed limit based on the location of the vehicle in the road segment and the set of rules for deriving the dynamic speed limit. According to aspects of the present disclosure, the set of rules for deriving the dynamic speed limit comprises at least one of: current time and date, current weather condition, current road condition, and a vehicle class, wherein the vehicle class includes a weight of the vehicle.

In block 810, the navigation device 702 may be configured to obtain a current time and date, and retrieve the dynamic speed limit from a database of the navigation device based on the current time and date, and the location of the vehicle in the road segment. According to aspects of the present disclosure, the dynamic speed limit may comprise at least one of: the dynamic speed limit for the lane the vehicle is in at the current time and date, the dynamic speed limit for a vehicle class at the current time and date, the dynamic speed limit for the road segment for day time traffic, the dynamic speed limit for the road segment for night time traffic, the dynamic speed limit for the road segment for rush hour traffic, the dynamic speed limit for the road segment for non-rush hour traffic, and the dynamic speed limit for the road segment in one of Spring, Summer, Autumn, and Winter. The navigation device 702 may determine the dynamic speed limit based on one or more of the above information in combination.

In block 812, the navigation device 702 may be configured to receive crowdsourcing data from a server based on a speed limit posted for the road segment, where the crowdsourcing data may be gathered from a plurality of vehicles, and where the crowdsourcing data may include on board diagnostics data (OBD) correlated with time stamps and GPS locations reported by the plurality of vehicles, and determine the dynamic speed limit based on the speed limit posted for the road segment.

In block 814, the navigation device 702 may be configured to detect a current speed of the vehicle, compare the current speed of the vehicle to the dynamic speed limit of the road segment, and generate a warning to a driver in response to the current speed exceeds the dynamic speed limit of the road segment.

Note that at least the following three paragraphs, FIG. 7 and FIG. 8 and their corresponding descriptions provide means for determining a location of a vehicle in a road segment by a navigation device; means for determining a dynamic speed limit in accordance with the location of the vehicle in the road segment; means for displaying the dynamic speed limit in a display of the navigation device; means for retrieving a set of rules for deriving the dynamic speed limit; means for determining the dynamic speed limit based on the location of the vehicle in the road segment and the set of rules for deriving the dynamic speed limit; means for obtaining a current time and date; means for retrieving the dynamic speed limit from a database of the navigation device based on the current time and date, and the location of the vehicle in the road segment; means for receiving crowdsourcing data from a server based on a speed limit posted for the road segment; means for determining the dynamic speed limit based on the speed limit posted for the road segment; means for detecting a current speed of the vehicle; means for comparing the current speed of the vehicle to the dynamic speed limit of the road segment; and means for generating a warning to a driver in response to the current speed exceeds the dynamic speed limit of the road segment.

The methodologies and navigation device described herein can be implemented by various means depending upon the application. For example, these methodologies can be implemented in hardware, firmware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. Herein, the term "control logic" encompasses logic implemented by software, hardware, firmware, or a combination.

For a firmware and/or software implementation, the methodologies can be implemented with modules (e.g., procedures, functions, and so on) that perform the functions described herein. Any machine readable medium tangibly embodying instructions can be used in implementing the methodologies described herein. For example, software codes can be stored in a memory and executed by a processing unit. Memory can be implemented within the processing unit or external to the processing unit. As used herein the term "memory" refers to any type of long term, short term, volatile, nonvolatile, or other storage devices and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media may take the form of an article of manufacturer. Computer-readable media includes physical computer storage media and/or other non-transitory media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

The disclosure may be implemented in conjunction with various wireless communication networks such as a wireless wide area network (WWAN), a wireless local area network (WLAN), a wireless personal area network (WPAN), and so on. The terms "network" and "system" are often used interchangeably. The terms "position" and "location" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a Long Term Evolution (LTE) network, a WiMAX (IEEE 802.16) network and so on. A CDMA network may implement one or more radio access technologies (RATs) such as cdma2000, Wideband-CDMA (W-CDMA), and so on. Cdma2000 includes IS-95, IS2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

A mobile station refers to a device such as a cellular or other wireless communication device, personal communication system (PCS) device, personal navigation device (PND), Personal Information Manager (PIM), Personal Digital Assistant (PDA), laptop or other suitable navigation device which is capable of receiving wireless communication and/or navigation signals. The term "mobile station" is also intended to include devices which communicate with a personal navigation device (PND), such as by short-range wireless, infrared, wire line connection, or other connection—regardless of whether satellite signal reception, assistance data reception, and/or position-related processing occurs at the device or at the PND. Also, "mobile station" is intended to include all devices, including wireless communication devices, computers, laptops, etc. which are capable of communication with a server, such as via the Internet, Wi-Fi, or other network, and regardless of whether satellite signal reception, assistance data reception, and/or position-related processing occurs at the device, at a server, or at another device associated with the network. Any operable combination of the above are also considered a "mobile station."

Designation that something is "optimized," "required" or other designation does not indicate that the current disclosure applies only to systems that are optimized, or systems in which the "required" elements are present (or other limitation due to other designations). These designations refer only to the particular described implementation. Of course, many implementations are possible. The techniques can be used with protocols other than those discussed herein, including protocols that are in development or to be developed.

One skilled in the relevant art will recognize that many possible modifications and combinations of the disclosed embodiments may be used, while still employing the same basic underlying mechanisms and methodologies. The foregoing description, for purposes of explanation, has been written with references to specific embodiments. However, the illustrative discussions above are not intended to be exhaustive or to limit the disclosure to the precise forms disclosed. Many modifications and variations are possible in view of the above teachings. The embodiments were chosen and described to explain the principles of the disclosure and their practical applications, and to enable others skilled in the art to best utilize the disclosure and various embodiments with various modifications as suited to the particular use contemplated.

I claim:

1. A method of providing navigation guidance by a navigation device, comprising:
   determining a location of a vehicle in a road segment, wherein the location of the vehicle in the road segment includes a lane the vehicle is in;
   determining a dynamic speed limit in accordance with the location of the vehicle in the road segment; and
   displaying the dynamic speed limit in a display of the navigation device, wherein the dynamic speed limit reflects a legal speed limit at the time of displaying, the legal speed limit representing a speed limit applicable to a plurality of vehicles in the road segment.

2. The method of claim 1, wherein the determining a dynamic speed limit in accordance with the location of the vehicle in the road segment comprises:
   retrieving a set of rules for deriving the dynamic speed limit; and
   determining the dynamic speed limit based on the location of the vehicle in the road segment and the set of rules for deriving the dynamic speed limit.

3. The method of claim 2, wherein the set of rules for deriving the dynamic speed limit comprises at least one of:
   current time and date;
   current weather condition;
   current road condition; and
   a vehicle class, wherein the vehicle class includes a weight of the vehicle.

4. The method of claim 1, wherein the determining a dynamic speed limit in accordance with the location of the vehicle in the road segment further comprises:
   obtaining a current time and date; and
   retrieving the dynamic speed limit from a database of the navigation device based on the current time and date, and the location of the vehicle in the road segment.

5. The method of claim 4, wherein the dynamic speed limit comprises at least one of:
   the dynamic speed limit for the lane the vehicle is in at the current time and date;
   the dynamic speed limit for a vehicle class at the current time and date;
   the dynamic speed limit for the road segment for day time traffic;
   the dynamic speed limit for the road segment for night time traffic;
   the dynamic speed limit for the road segment for rush hour traffic;
   the dynamic speed limit for the road segment for non-rush hour traffic; and
   the dynamic speed limit for the road segment in one of Spring, Summer, Autumn, and Winter.

6. The method of claim 1, wherein the determining a dynamic speed limit in accordance with the location of the vehicle in the road segment further comprises:
   receiving crowdsourcing data from a server based on a speed limit posted for the road segment, wherein the crowdsourcing data is gathered from a plurality of vehicles, and wherein the crowdsourcing data includes on board diagnostics data (OBD) correlated with time stamps and GPS locations reported by the plurality of vehicles; and determining the dynamic speed limit based on the received crowdsourcing data.

7. The method of claim 1, further comprises:
detecting a current speed of the vehicle;
comparing the current speed of the vehicle to the dynamic speed limit of the road segment; and
generating a warning to a driver in response to the current speed exceeds the dynamic speed limit of the road segment.

8. A navigation device, comprising:
a control unit including processing logic, the processing logic comprising:
logic configured to determine a location of a vehicle in a road segment, wherein the location of the vehicle in the road segment includes a lane the vehicle is in;
logic configured to determine a dynamic speed limit in accordance with the location of the vehicle in the road segment; and
logic configured to display the dynamic speed limit in a display of the navigation device, wherein the dynamic speed limit reflects a legal speed limit at the time of displaying, the legal speed limit representing a speed limit applicable to a plurality of vehicles in the road segment.

9. The navigation device of claim 8, wherein the logic configured to determine a dynamic speed limit in accordance with the location of the vehicle in the road segment comprises:
logic configured to retrieve a set of rules for deriving the dynamic speed limit; and
logic configured to determine the dynamic speed limit based on the location of the vehicle in the road segment and the set of rules for deriving the dynamic speed limit.

10. The navigation device of claim 9, wherein the set of rules for deriving the dynamic speed limit comprises at least one of:
current time and date;
current weather condition;
current road condition; and
a vehicle class, wherein the vehicle class includes a weight of the vehicle.

11. The navigation device of claim 8, wherein the logic configured to determine a dynamic speed limit in accordance with the location of the vehicle in the road segment further comprises:
logic configured to obtain a current time and date; and
logic configured to retrieve the dynamic speed limit from a database of the navigation device based on the current time and date, and the location of the vehicle in the road segment.

12. The navigation device of claim 11, wherein the dynamic speed limit comprises at least one of:
the dynamic speed limit for the lane the vehicle is in at the current time and date;
the dynamic speed limit for a vehicle class at the current time and date;
the dynamic speed limit for the road segment for day time traffic;
the dynamic speed limit for the road segment for night time traffic;
the dynamic speed limit for the road segment for rush hour traffic;
the dynamic speed limit for the road segment for non-rush hour traffic; and
the dynamic speed limit for the road segment in one of Spring, Summer, Autumn, and Winter.

13. The navigation device of claim 8, wherein the logic configured to determine a dynamic speed limit in accordance with the location of the vehicle in the road segment further comprises:
logic configured to receive crowdsourcing data from a server based on a speed limit posted for the road segment, wherein the crowdsourcing data is gathered from a plurality of vehicles, and wherein the crowdsourcing data includes on board diagnostics data (OBD) correlated with time stamps and GPS locations reported by the plurality of vehicles; and
logic configured to determine the dynamic speed limit based on the received crowdsourcing data.

14. The navigation device of claim 8, further comprises:
logic configured to detect a current speed of the vehicle;
logic configured to compare the current speed of the vehicle to the dynamic speed limit of the road segment; and
logic configured to generate a warning to a driver in response to the current speed exceeds the dynamic speed limit of the road segment.

15. A computer program product comprising non-transitory medium storing instructions for execution by a navigation device, the instructions comprising:
instructions for determining a location of a vehicle in a road segment, wherein the location of the vehicle in the road segment includes a lane the vehicle is in;
instructions for determining a dynamic speed limit in accordance with the location of the vehicle in the road segment; and
instructions for displaying the dynamic speed limit in a display of the navigation device, wherein the dynamic speed limit reflects a legal speed limit at the time of displaying, the legal speed limit representing a speed limit applicable to a plurality of vehicles in the road segment.

16. The computer program product of claim 15, wherein the instructions for determining a dynamic speed limit in accordance with the location of the vehicle in the road segment comprises:
instructions for retrieving a set of rules for deriving the dynamic speed limit; and
instructions for determining the dynamic speed limit based on the location of the vehicle in the road segment and the set of rules for deriving the dynamic speed limit.

17. The computer program product of claim 16, wherein the set of rules for deriving the dynamic speed limit comprises at least one of:
current time and date;
current weather condition;
current road condition; and
a vehicle class, wherein the vehicle class includes a weight of the vehicle.

18. The computer program product of claim 15, wherein the instructions for determining a dynamic speed limit in accordance with the location of the vehicle in the road segment further comprises:
instructions for obtaining a current time and date; and
instructions for retrieving the dynamic speed limit from a database of the navigation device based on the current time and date, and the location of the vehicle in the road segment.

19. The computer program product of claim 18, wherein the dynamic speed limit comprises at least one of:
- the dynamic speed limit for the lane the vehicle is in at the current time and date;
- the dynamic speed limit for a vehicle class at the current time and date;
- the dynamic speed limit for the road segment for day time traffic;
- the dynamic speed limit for the road segment for night time traffic;
- the dynamic speed limit for the road segment for rush hour traffic;
- the dynamic speed limit for the road segment for non-rush hour traffic; and
- the dynamic speed limit for the road segment in one of Spring, Summer, Autumn, and Winter.

20. The computer program product of claim 15, wherein the instructions for determining a dynamic speed limit in accordance with the location of the vehicle in the road segment further comprises:
- instructions for receiving crowdsourcing data from a server based on a speed limit posted for the road segment, wherein the crowdsourcing data is gathered from a plurality of vehicles, and wherein the crowdsourcing data includes on board diagnostics data (OBD) correlated with time stamps and GPS locations reported by the plurality of vehicles; and
- instructions for determining the dynamic speed limit based on the received crowdsourcing data.

21. The computer program product of claim 15, further comprises:
- instructions for detecting a current speed of the vehicle;
- instructions for comparing the current speed of the vehicle to the dynamic speed limit of the road segment; and
- instructions for generating a warning to a driver in response to the current speed exceeds the dynamic speed limit of the road segment.

22. An apparatus, comprising:
- means for determining a location of a vehicle in a road segment, wherein the location of the vehicle in the road segment includes a lane the vehicle is in;
- means for determining a dynamic speed limit in accordance with the location of the vehicle in the road segment; and
- means for displaying the dynamic speed limit in a display of the apparatus, wherein the dynamic speed limit reflects a legal speed limit at the time of displaying, the legal speed limit representing a speed limit applicable to a plurality of vehicles in the road segment.

23. The apparatus of claim 22, wherein the means for determining a dynamic speed limit in accordance with the location of the vehicle in the road segment comprises:
- means for retrieving a set of rules for deriving the dynamic speed limit; and
- means for determining the dynamic speed limit based on the location of the vehicle in the road segment and the set of rules for deriving the dynamic speed limit.

24. The apparatus of claim 22, wherein the means for determining a dynamic speed limit in accordance with the location of the vehicle in the road segment further comprises:
- means for obtaining a current time and date; and
- means for retrieving the dynamic speed limit from a database of the apparatus based on the current time and date, and the location of the vehicle in the road segment.

25. The apparatus of claim 22, wherein the means for determining a dynamic speed limit in accordance with the location of the vehicle in the road segment further comprises:
- means for receiving crowdsourcing data from a server based on a speed limit posted for the road segment, wherein the crowdsourcing data is gathered from a plurality of vehicles, and wherein the crowdsourcing data includes on board diagnostics data (OBD) correlated with time stamps and GPS locations reported by the plurality of vehicles; and
- means for determining the dynamic speed limit based on the received crowdsourcing data.

26. The apparatus of claim 22, further comprises:
means for detecting a current speed of the vehicle;
means for comparing the current speed of the vehicle to the dynamic speed limit of the road segment; and
means for generating a warning to a driver in response to the current speed exceeds the dynamic speed limit of the road segment.

* * * * *